US011762806B2

(12) United States Patent
Rath et al.

(10) Patent No.: US 11,762,806 B2
(45) Date of Patent: Sep. 19, 2023

(54) HARDENING SYSTEM CLOCK FOR RETENTION LOCK COMPLIANCE ENABLED SYSTEMS

(71) Applicant: EMC IP Holding Company LLC, Hopkinton, MA (US)

(72) Inventors: Jagannathdas Rath, Bengaluru (IN); Kalyan C Gunda, Bangalore (IN); Rekha Sampath, Saratoga, CA (US); Satish Inampudi, Sunnyvale, CA (US); Senthil Ponnuswamy, San Jose, CA (US); Sophie Syau Fang Deng, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 314 days.

(21) Appl. No.: 17/071,983

(22) Filed: Oct. 15, 2020

(65) Prior Publication Data

US 2022/0121620 A1 Apr. 21, 2022

(51) Int. Cl.
*G06F 16/11* (2019.01)
*G06F 1/14* (2006.01)
*G06F 21/60* (2013.01)
*G06F 16/16* (2019.01)
*G06F 1/10* (2006.01)

(52) U.S. Cl.
CPC .............. *G06F 16/125* (2019.01); *G06F 1/10* (2013.01); *G06F 1/14* (2013.01); *G06F 16/162* (2019.01); *G06F 21/602* (2013.01)

(58) Field of Classification Search
CPC ........ G06F 16/125; G06F 16/162; G06F 1/10; G06F 1/14; G06F 21/602
See application file for complete search history.

(56) References Cited

U.S. PATENT DOCUMENTS

| | | | | |
|---|---|---|---|---|
| 5,497,141 | A * | 3/1996 | Coles ................. | G06Q 10/1091 235/377 |
| 6,907,081 | B2 * | 6/2005 | Mantchala ......... | H04N 21/8455 348/700 |
| 7,953,705 | B2 * | 5/2011 | Chron .................. | G06F 3/0652 707/696 |
| 8,327,028 | B1 * | 12/2012 | Shah ...................... | H04L 69/40 709/248 |

(Continued)

*Primary Examiner* — Tamara T Kyle
*Assistant Examiner* — Nargis Sultana
(74) *Attorney, Agent, or Firm* — Staniford Tomita LLP

(57) ABSTRACT

A system clock is protected by limiting clock changes, change frequency, and calculating skew. System and secure clocks are initialized to a same time. First and second thresholds are set. The first threshold corresponds to an alert and the second threshold corresponds to an action. At a time interval at which the secure clock is to be updated, a skew is calculated between the system and secure clocks, and a cumulative skew is calculated. Upon a determination that the cumulative skew has reached the first threshold, but not the second threshold, the alert is triggered while deletions of files having retention locks that have expired according to the system clock are allowed to continue. Upon a determination that the cumulative skew has reached the second threshold, the action is triggered. The action includes blocking the deletions of files having retention locks that have expired according to the system clock.

18 Claims, 9 Drawing Sheets

(56) References Cited

U.S. PATENT DOCUMENTS

| | | | | |
|---|---|---|---|---|
| 8,407,185 | B2* | 3/2013 | Akagawa | G06F 16/125 |
| | | | | 707/662 |
| 8,782,009 | B2* | 7/2014 | Shaath | G06F 16/125 |
| | | | | 707/661 |
| 10,929,389 | B2* | 2/2021 | Wolfson | G06F 16/2365 |
| 11,341,230 | B1* | 5/2022 | Ponnuswamy | H04L 63/083 |
| 2005/0097260 | A1* | 5/2005 | McGovern | G06F 16/125 |
| | | | | 711/100 |
| 2008/0059446 | A1* | 3/2008 | Blass | G06F 16/951 |
| | | | | 707/999.005 |
| 2008/0263112 | A1* | 10/2008 | Shaath | G06F 16/125 |
| 2011/0295814 | A1* | 12/2011 | Kothari | G06F 16/217 |
| | | | | 707/687 |
| 2012/0197845 | A1* | 8/2012 | Kim | G06F 16/185 |
| | | | | 707/662 |
| 2014/0019497 | A1* | 1/2014 | Cidon | G06F 16/182 |
| | | | | 707/827 |
| 2017/0060885 | A1* | 3/2017 | Gan | G06F 16/125 |
| 2020/0134065 | A1* | 4/2020 | Wolfson | G06F 16/2365 |
| 2021/0037386 | A1* | 2/2021 | Oesterling | G06F 21/602 |
| 2021/0089835 | A1* | 3/2021 | Ma | G06K 9/6284 |

* cited by examiner

Configure Settings Page
305

310 — Clock-violation Alert Threshold [ 20 ] minutes

315 — Clock-violation Action Threshold [ 60 ] minutes

320 — Clock-violation Actions

- [X] Disable delete operations
- [ ] Disable filesystem
- [ ] Make filesystem read-only
- [ ] Update effective file expiration dates 325 — Maximum Allowed Time Change [ 4 ] minutes 330 — Maximum Change Frequency [ 2 ] days 335 — Secure Clock Update Interval [ 10 ] minutes 340 — Alert Message Recipients

| Name | Email | Phone |
| --- | --- | --- |
| Madeleine Rock | maddie@admin.com | 555-555-5555 |
| Violet Ripmo | violet@admin.com | 444-444-4444 |

[ Add Recipient ]

[ Cancel ]  [ Save ]

FIG. 3

HARDENING SYSTEM CLOCK FOR RETENTION LOCK COMPLIANCE ENABLED SYSTEMS

TECHNICAL FIELD

The present invention relates generally to the field of information management, and, more particularly, to data retention.

BACKGROUND

Corporate governance and compliance standards require that certain data for business records must be retained for long periods of time. For example, SEC Rule 17a-4 is a regulation issued by the U.S. Securities and Exchange Commission pursuant to its regulatory authority under the US Securities Exchange Act of 1934 (known simply as the "Exchange Act") which outlines requirements for data retention, indexing, and accessibility for companies which deal in the trade or brokering of financial securities such as stocks, bonds, and futures. According to the rule, records of numerous types of transactions must be retained and indexed on indelible media with immediate accessibility for a period of two years, and with non-immediate access for a period of at least six years. Duplicate records must also be kept within the same time frame at an off-site location.

It is desirable for a storage system to offer retention locking mechanisms so that a file that must be retained for a particular period of time cannot be deleted or modified, whether accidentally or intentionally. These retention locking mechanisms rely on the system clock to determine whether the retention lock on the file has expired. The system clock is a type of timer in computer systems that helps the computer keep track of the passage of time. In some cases, however, it is relatively simple for a malicious actor such as a rogue system administrator to change the system clock. Consider, as an example, that a particular file has a retention lock whose expiration date is six years from now. A rogue administrator may be able to defeat the retention lock by simply moving the system clock ahead by six years.

Therefore, there is a need for improved systems and techniques to increase the robustness of the system clock.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 shows an example of a user interface for configuring threshold settings in accordance with one or more embodiments.

DETAILED DESCRIPTION

Figure 1:
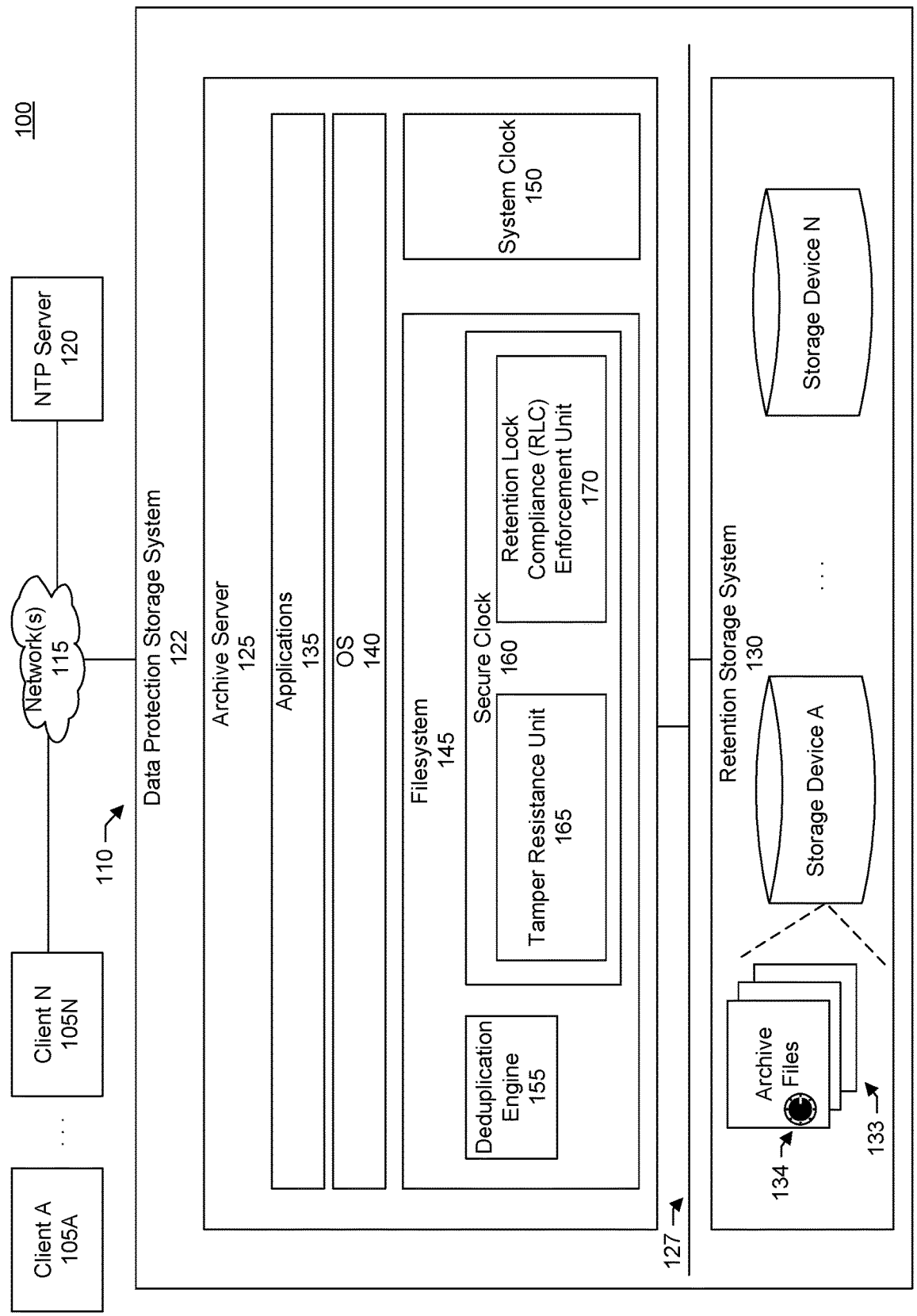
FIG. 1 shows a block diagram of an information handling system having a hardened system clock in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, solid state drives, non-volatile memory express (NVME) drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

The following non-limiting definitions shown in table A below may be helpful in understanding the specification and claims:

including files, email, and other pieces of data 133. Files that are archived may be associated with a retention lock 134 placed on the file by the filesystem. The retention lock allows a customer of the data protection storage system to "lock" the files for a certain amount of time during which the files cannot be deleted (or modified). The retention lock may specify an expiration date after which the file can be deleted.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or partitioned into multiple LUNs. A LUN may include a portion of a disk, portions of multiple disks, or multiple complete disks.

TABLE A

| Terms | Definitions |
| --- | --- |
| Local Time | This is based on the local operating system such as Linux kernel time. This is controlled by Linux system's "date" command. |
| NTP Time | This is the time maintained by external NTP timeserver(s). |
| System Time (or System Clock) | If system is configured to use NTP, this would be NTP time. Else, this would be Local Time. |
| Secure Clock | This is the time that the filesystem maintains which is also based on the Linux Kernel. This is not impacted by the Linux system "date" command. |
| Skew | The time difference between Secure Clock and System Time. |
| Hardware Clock | This is the time maintained by complementary metal-oxide semiconductor (CMOS). This is periodically synchronized with system time. When the system boots up, Local Time maintained by the operating system is picked up from the hardware clock. |
| Clock-violation-alert | Alert notifications that would be raised in the system when clock skew increases beyond a pre-configured threshold and further. |
| Clock-violation-action | A configurable action that the system can trigger if the skew reaches the configured maximum skew. One such action is filesystem-disable. |

FIG. 1 shows a block diagram of a system 100 having a hardened system clock for retention lock compliance. This system includes any number of clients 105A-N, an information handling system (IHS) 110, and a network 115 connecting the clients and information handling system. In some embodiments, the information handling system may be connected to a network time protocol (NTP) server 120. The NTP server is optional and is not included in some embodiments. The variable N and other similar index variables are assumed to be arbitrary positive integers greater than or equal to two.

In a specific embodiment, the information handling system includes a data protection storage system 122. The data protection storage system includes an archive or backup server 125 connected to a retention storage system 130 via, for example, a local area network (LAN), storage area network (SAN), or other interconnect 127. The storage system is responsible for storage of backup and archive data An example of a data protection storage system is Data Domain as provided by Dell EMC of Hopkinton, Mass. Data Domain is a data deduplication storage system that provides backup, restore, retrieval, and archive operations. Some embodiments are described in conjunction with a data protection storage system referred to as Data Domain. It should be appreciated, however, that aspects and principles of the systems and techniques described herein can be applied to other data protection storage systems.

A client is any host having or generating data that is to be protected by the data protection storage system. The data may include unstructured data including files (e.g., word processing documents) or email data, structured data including databases, or both. Such data may be copied or moved from the client to the retention storage system for long-term storage. A client may receive an instruction from the server as to when an archiving operation should be initiated. Instead or additionally, the client can contact the server to initiate the archiving operation. The server can then coordinate access to the retention storage system. A client can be any type of computing device including a virtual computing device. Some examples of clients include desktop computers, laptops, tablet devices, smartphones, servers, virtual machines, containers, and so forth. Backup data may include, for example, databases, emails, user-generated files, and other data.

The archive server is responsible for coordinating and scheduling data movement operations including archive operations, backups, facilitating recoveries, maintaining metadata, configuration, and backup file indices, maintaining archive data, and overall management of the data that needs to be retained. In particular, the server may include an application (e.g., archiving or backup application) 135, operating system (OS) 140, file system 145, and system clock 150. The operating system manages computer hardware, software resources, and provides common services for the application programs.

The system clock represents the server's notion of the passage of time. In a specific embodiment, the system clock may be configured to synchronize with the NTP server. The network time protocol is designed to synchronize the clocks on computers and networks across the Internet or LANs. The NTP server is optional and is not included in some embodiments.

The filesystem provides a way to organize data stored at the storage system and present and group that data to the applications in a logical format, e.g., file. In a specific embodiment, the filesystem is a deduplicated filesystem. The filesystem may include a deduplication engine 155 and a secure clock 160. The deduplication engine is responsible for deduplicating the data copied to the backup storage system. Data, e.g., files, may be divided, chunked, or segmented into various data units. Fingerprints are computed for each data unit. A fingerprint index is maintained that lists fingerprints corresponding to data units that have already been stored. A fingerprint of a data unit is compared against the fingerprint index to determine whether the data unit is unique or a duplicate. Unique data units may be stored. Data units identified as duplicate or redundant data already stored may not be again stored.

The secure clock is responsible for maintaining the integrity of the system clock. In a specific embodiment, the secure clock includes a tamper resistance unit 165 and retention lock compliance (RLC) enforcement unit 170. It should be appreciated that the blocks, components, and modules shown in FIG. 1 may be functional and there can be many different hardware configurations, software configurations, or both to implement the functions described.

Certain data including files, emails, or other pieces of data are subject to corporate governance rules and regulatory compliance standards. For example, the U.S. Securities and Exchange Commission (SEC) requires that certain financial records be retained in an unalterable form for a period of seven years.

Thus, when an administrator, via the filesystem, sets a retention lock on a file, the file should not be able to be modified or deleted until the retention time expires. The problem is when a rogue administrator or other malicious actor moves system time ahead, the retention lock gets expired prematurely. Once the lock expires, the file can be modified or deleted.

In addition, if a rogue administrator configures a system to use NTP and works with a rogue NTP administrator to accelerate the time on the NTP timeserver, then NTP utilities can be used to modify system time. This also violates the retention-lock compliance status of the system.

In order to avoid the premature release of retention lock on files, it is desirable that the system clock configuration is secured so that the files are protected. And, as a second level of defense, it is desirable that the system can be configured to take corrective or remediation actions such as making the files read-only, shutting down the filesystem or disabling filesystem, other actions, or combinations of these if system time is modified in any malicious way.

The secure clock is responsible for helping to ensure that archive files can be committed for a specific period of time during which the contents of the secured files cannot be deleted or modified; and then allowing for the deletion of the retained data once the retention period expires. In some cases, unlike backup files, an archive file may be the only copy of the file that exists because the archive file is intended to be retained for purposes of regulatory compliance rather than for recovery purposes. Thus, it is desirable to have security controls so that the integrity of files designated as archive data meets corporate governance rules and regulatory compliance standards.

The tamper resistance unit of the secure clock is responsible for detecting and preventing tampering of the system clock. In a specific embodiment, a detection algorithm periodically calculates a skew between the system clock and the secure clock. The secure clock maintains a cumulative skew of previous skew calculations. The cumulative skew is compared against one or more pre-configured threshold values. If or when the threshold is reached, the RLC enforcement unit is triggered. Depending upon the extent of tampering attempts as indicated by an amount of the cumulative skew, the RLC enforcement unit may generate and transmit alert messages to administrators to notify each administrator of a possible threat and allow them to investigate, automatically take one or more corrective or remedial actions with the filesystem, or combinations of these.

In a specific embodiment, the ability of the administrator to tamper with the system clock is limited by: 1) Restricting administrator ability to change the clock say by more than XX time (as an example, XX could be 30 mins and is configurable); and 2) Restricting the administrator from changing the time too frequently (e.g., administrator permitted to change time only once a day). In a specific embodiment, these restrictions once set on the system cannot be changed by the administrator, thereby protecting the system from a rogue administrator who is attempting to defeat the other restrictions.

In a specific embodiment, clock skews are continuously monitored by the secure clock and accumulated over time. Systems and techniques are provided for handling the skew when detected. One or more actions can be configured for: 1) disabling the filesystem; 2) making the filesystem read-only (RO); 3) disabling file deletes for expired files; or 4) adding accumulated skew to the expiry dates of files during deletes. For any unforeseen reason if the time is moved ahead, the secure clock configurations provides additional layer of security and prevents any data from being modified or deleted.

Below are some details associated with the secure clock according to one or more embodiments.

1. System Time is blocked from being moved ahead/behind by more than a configurable limit.

2. System Time is blocked from being changed more frequently than a configurable frequency.

3. The limit and frequency values are blocked from being modified after system is in retention-lock compliance mode.

4. Alerts are raised whenever an administrator tries to modify system clock, i.e., local time or NTP configuration.

5. A dedicated secure clock detects any clock skew that might have been introduced in the system via any means. In an embodiment, the secure clock constantly checks for presence of any skew and continuously accumulates the skew, in-memory and persistently, until certain pre-configured thresholds. Post which, alerts will be raised, and configured clock violation actions will be triggered in the system.

6. Configure the corrective action for the system if the clock skew between filesystem and system clock is identified to be more than configured maximum skew. Examples of corrective actions include making the filesystem read-only, disabling the deletion of files, disabling filesystem, adding accumulated clock skew to expiry dates for delete operations, other actions or combinations of these. Additional actions can be defined in case of a clock violation.

7. Even if the system goes down, the skew value will not increase. This helps to ensure that a clock-violation-action is not triggered prematurely.

8. Secure clock validation is performed for file deletions to ensure pre-mature deletion of data is not allowed at any point of time.

9. Secure clock cannot be tampered by any means as any attempt for that would require entering into the system shell. A shell is an interface that provides access to the filesystem services. Customers are not provided access to the shell and the shell requires a cryptographically strong key that can be provided only by the vendor support team. The secure clock data is stored in a proprietary binary format and is not publicly visible or easily accessible.

In a specific embodiment, systems and techniques include an ability to restrict a rogue administrator from tampering with time via system time commands; providing protection against rogue NTP server administrators; providing controls so that the system time cannot be moved more than the configured amount of time; and disallowing any damage or modification to the data, even if a rogue administrator finds a way to skew the clock.

Figure 2:
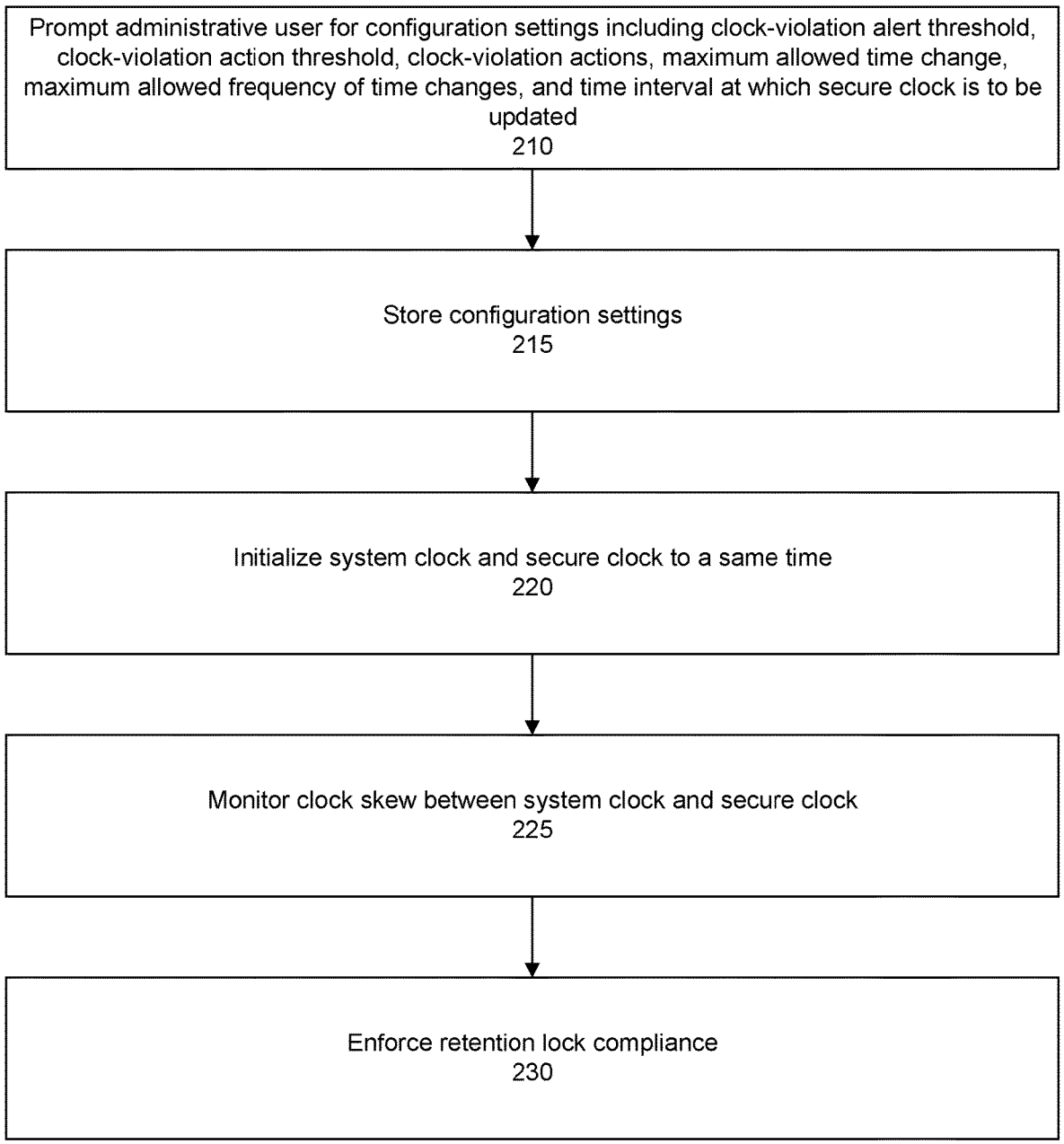
FIG. 2 shows an overall flow of a process for hardening a system clock in accordance with one or more embodiments.

FIG. 2 shows an overall flow for hardening a system clock to help ensure retention lock compliance. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, during an initial setup process of the data protection storage system, an administrative user is prompted to input configuration settings for the secure clock. These configurable parameters help prevent tampering with the system clock thereby ensuring retention-lock compliance. The configuration settings may include a clock-violation alert threshold, clock-violation action threshold, clock-violation actions, maximum allowed time change, maximum allowed frequency of time changes, and time interval at which the secure clock is to be updated. The time interval defines the schedule for updating the secure clock.

In a specific embodiment, there are a date-change-limit, date-change-frequency, clock-violation-alerts, and clock-violation actions. The date-change-limit parameter defines the maximum amount of time a system time can be moved forward or backward. This ensures that on a RLC enabled system, the system time cannot be changed at will. This also provides the flexibility for user to configure system time in case of any drift.

The date-change-frequency parameter defines how often system time can be changed. This is to prevent a rogue administrator from changing system time by small amounts (i.e., within date-change-limit) multiple times in an attempt to circumvent the date-change-limit.

In an embodiment, the secure clock constantly monitors for the presence of any clock skew and if the accumulated skew reaches a pre-configured threshold and further, then alerts are raised to make the customer, or more specifically other system administrators of the customer, aware as early as possible so that they can take necessary action to fix the skew. Customers can configure one or more clock-violation-actions, which would be executed, if the skew is determined to be more than the configured maximum skew.

FIG. 3 shows an example of a configuration settings page 305. The page may be displayed to the customer administrator user via a user interface during an initial configuration of the data protection storage system. It is expected during the initial setup that all the appropriate administrators will come to an agreement on the configuration values.

A setting 310 allows for configuring a clock-violation alert threshold (e.g., 20 minutes). A setting 315 allows for configuring a clock-violation action threshold (e.g., 60 minutes). A value of the clock-violation threshold may be set to be greater than a value of the clock-violation alert threshold. A setting 320 allows for selecting any number of clock-violation actions to be triggered when the cumulative skew reaches the clock-violation action threshold (e.g., disable delete operations). A setting 325 allows for configuring a maximum amount of time the system time can be moved forwards or backwards (e.g., 4 minutes). A setting 330 allows for configuring a maximum frequency of time changes (e.g., once in 2 days). In other words, the setting specifies a time interval in which the clock can be changed once or a single time. Thus, a setting of 2 days means the time can be changed once every 2 days. A setting 335 allows for configuring a time interval at which the secure clock will be updated (e.g., update secure clock at 10 minute intervals). A setting 340 allows for entering alert message recipients including email address and phone number for text messages or voice calls. It should be appreciated that the values shown in FIG. 3 are merely for purposes of examples. For example, the secure clock may be scheduled to be updated every 1 minute, 2 minutes, 3 minutes, 4 minutes, 5 minutes, or any other period of time as desired.

Referring back now to FIG. 2, in a step 215, the configuration settings are stored. In a specific embodiment, the data of the secured clock including the values for the configuration settings are encoded or stored in a binary format that is proprietary to the data protection system (or vendor of the data protection system). Thus, the decoding of the stored data may be limited to tools that the vendor has itself developed. Such tools may not be provided to the customer in order to further protect against tampering and rogue administrators.

In a step 220, the system clock and secure clock are initialized to a same time. In a step 225, monitoring is conducted of a clock skew between the system clock and the secure clock. The monitoring includes maintaining a cumulative skew that is an aggregate or running total of past or previous skew values.

In a step 230, retention lock compliance is enforced. Enforcement may include enforcing the maximum allowed time change by blocking the administrator from moving the system clock forwards or backwards by the pre-configured amount. Enforcement may include blocking the administrator from changing the system clock past a certain number of times within a particular time period (e.g., system clock change allowed once in every 2 days). Enforcement may include generating and transmitting clock-violation alerts (e.g., text messages or emails or simple network management protocol (snmp) traps or notifications in the data protection system) when the clock-violation alert threshold has been reached. Enforcement may include triggering one or more clock-violation actions (e.g., disabling filesystem or disabling delete operations, etc.) when the clock-violation action threshold has been reached.

Figure 4:
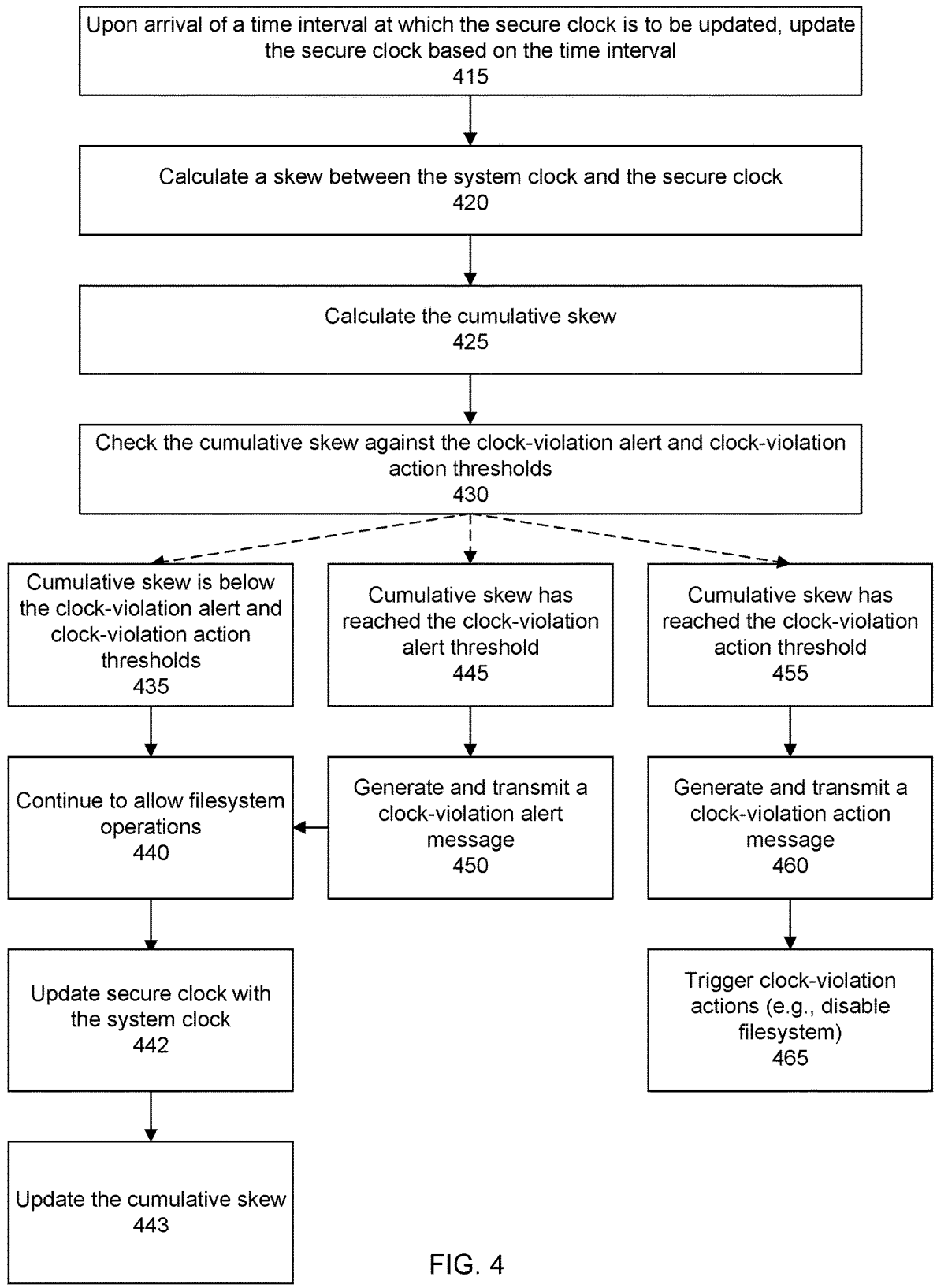
FIG. 4 shows further detail of a flow for monitoring the system clock in accordance with one or more embodiments.

FIG. 4 shows further detail of a flow for monitoring the system clock using the secure clock. In a step 415, upon arrival of a time interval at which the secure clock is to be updated, the secure clock is updated based on the time interval. The secure clock may be updated by adding a duration of the time interval to a last, previous, or most recent time of the secure clock. In a step 420, a skew is calculated between the system clock and the secure clock. The skew may be calculated by obtaining a difference or absolute difference between the system clock and the secure clock. In a step 425, a cumulative skew is calculated using the latest skew. In a step 430, the cumulative skew is checked against the clock-violation alert and clock-violation action thresholds.

The broken lines in the figure illustrate the various outcomes that may occur based on the checking or comparing of the cumulative skew against the clock-violation alert and clock-violation thresholds. In particular, if the cumulative skew is below the clock-violation alert and clock-violation action thresholds (step 435), filesystem operations are allowed to continue as normal (step 440); the secure clock is updated with the system clock time (step 442); and the cumulative skew is updated (step 443). The cumulative skew is maintained in persistent storage and in a protected binary format.

If the cumulative skew has reached the clock-violation alert threshold, but not the clock-violation action threshold, (step 445), a clock-violation alert message is generated and transmitted to the administrator and others (step 450); filesystem operations are allowed to continue as normal (step 440); the secure clock is updated with the system clock time (step 442); and the cumulative skew is updated (step 443). For example, the filesystem may allow retention locked files to be deleted if their retention dates have expired according to the system clock. Allowing filesystem operations to continue as normal, despite an alert having been transmitted, helps to prevent disruption to normal business operations while providing an opportunity for the administrator to investigate a potential threat and if required to fix the system clock.

If, however, the cumulative skew has reached the clock-violation action threshold (step 455), a clock-violation action message is transmitted (step 460) and one or more clock-violation actions are triggered (step 465), such as disabling the filesystem. A clock-violation action can result in a partial or complete disabling of filesystem services.

For example, at least some of the files in the filesystem may be made read-only. As another example, the cumulative skew may be added to the recorded expiration dates of at least some of the files thereby extending the date when they may be deleted. In other words, an effective expiry date of a file may be calculated as adding the cumulative skew present to a recorded expiry date for the file. Thus, tampering of the system clock can result in the file expiration dates being extended by the same amount of time that the system clock was extended.

As another example, file deletion operations may be blocked. There can be any number of clock-violation actions that are triggered when the cumulative skew reaches the clock-violation action threshold. Escalating to a partial or complete disabling of filesystem services helps to preserve the integrity of the files and give an administrator time to conduct an investigation. For example, when the filesystem is at least partially disabled, the filesystem may process requests from applications to read files, but may not process requests from the applications to write files. Alternatively, the filesystem may not process any requests from the applications.

In a specific embodiment, whenever a skew is detected, it is added to the cumulative skew. If the cumulative skew is more than the clock-violation action threshold, then only the corrective action is triggered. In this case the secure clock time is not updated. But, for all other cases, i.e., if the cumulative skew is less than the clock-violation action threshold (including more or less than the clock-violation alert threshold), the secure clock is updated with the latest system clock time.

Figure 5:
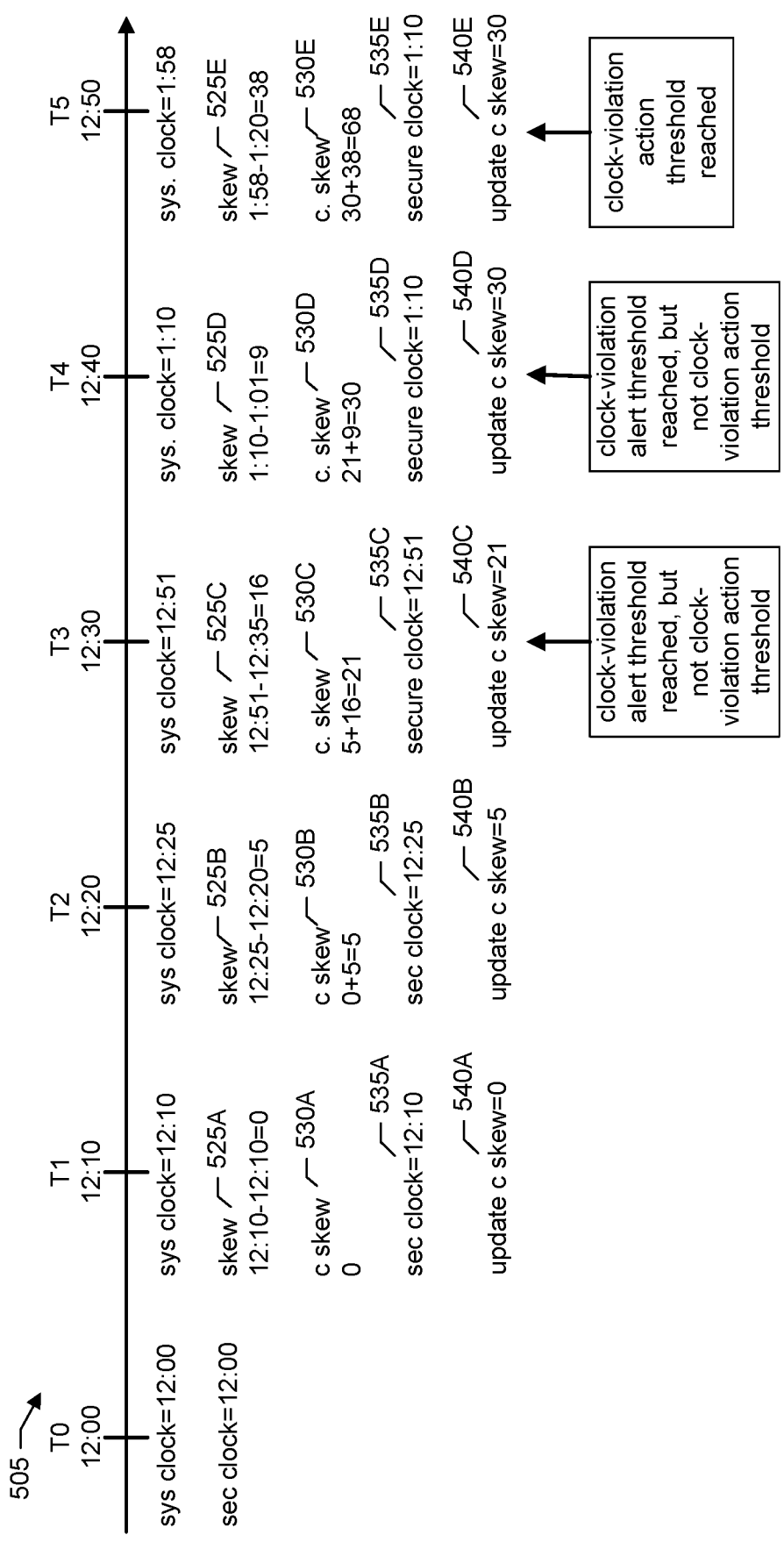
FIG. 5 shows an example of a timeline and some events that may occur during the monitoring in accordance with one or more embodiments.

For example, FIG. 5 shows a timeline 505 of sample events that may be handled and managed by the secure clock. In this example, a sample configuration includes a secure clock update time interval 510 set to 10 minutes, a clock-violation alert threshold 515 set to 20 minutes, and a clock-violation action threshold 520 set to 60 minutes.

At a time T0, the system and secure clocks have been initialized to a same time, e.g., 12:00 (step 220, FIG. 2).

A time T1 corresponds to a real time of 12:10 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:00. Thus, the expected time of the secure clock is 12:10 (e.g., 12:00+10 minutes=12:10). At time T1, system clock reads 12:10. A present, latest, or new skew 525A is calculated as being a difference between the time of the system clock and the expected time of the secure clock (step 420, FIG. 4). In this example, the present skew is 0 minutes (e.g., 12:10−12:10=0 minutes). A cumulative skew 530A is calculated by adding the present skew to a running total of the skew (step 425, FIG. 4). In this example, the cumulative skew remains 0 minutes. The cumulative skew is checked against the clock-violation alert and action thresholds (step 430, FIG. 4).

Since the cumulative skew of 0 minutes is below the clock-violation alert threshold of 20 minutes and the clock-violation action threshold of 60 minutes (step 435, FIG. 4), filesystem operations are allowed to continue as normal (step 440, FIG. 4); the secure clock is updated 535A to the system clock (step 442, FIG. 4); and the cumulative skew is updated 540A to the calculated cumulative skew (step 443, FIG. 4).

A time T2 corresponds to a real time of 12:20 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:10. Thus, the expected time of the secure clock is 12:20 (e.g., 12:10+10 minutes=12:20). At time T2, the system clock reads 12:25. A present, skew 525B is calculated as being a difference between the time of the system clock and the expected time of the secure clock (step 420, FIG. 4). In this example, the present skew is 5 minutes (e.g., 12:25−12:20=5 minutes).

A cumulative skew 530B is calculated by adding the present skew to a running total of the skew (step 425, FIG. 4). In this example, the cumulative skew is 5 minutes (e.g., 0 minutes+5 minutes=5 minutes). The cumulative skew is checked against the clock-violation alert and action thresholds (step 430, FIG. 4).

Since the cumulative skew of 5 minutes is below the clock-violation alert threshold of 20 minutes and the clock-violation action threshold of 60 minutes (step 435, FIG. 4), filesystem operations are allowed to continue as normal (step 440, FIG. 4); the secure clock is updated 535B to the system clock (step 442, FIG. 4); and the cumulative skew is updated 540B to the calculated cumulative skew (step 443, FIG. 4).

A time T3 corresponds to a real time of 12:30 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:25. Thus, the expected time of the secure clock is 12:35 (e.g., 12:25+10 minutes=12:35). At time T3, the system clock reads 12:51. A present, skew 525C is calculated as being a difference between the time of the system clock and the expected time of the secure clock (step 420, FIG. 4). In this example, the present skew is 16 minutes (e.g., 12:51−12:35=16 minutes).

A cumulative skew 530C is calculated by adding the present skew to a running total of the skew (step 425, FIG. 4). In this example, the cumulative skew is 21 minutes (e.g., 5 minutes+16 minutes=21 minutes). The cumulative skew is checked against the clock-violation alert and action thresholds (step 430, FIG. 4).

The cumulative skew of 21 minutes is above or has reached the clock-violation alert threshold of 20 minutes (step 445, FIG. 4), but is still below the clock-violation action threshold of 60 minutes. Thus, a clock-violation alert message is generated and transmitted (step 450, FIG. 4), filesystem operations are allowed to continue (step 440, FIG. 4); the secure clock is updated 535C to the system clock (step 442, FIG. 4); and the cumulative skew is updated 540C to the calculated cumulative skew (step 443, FIG. 4).

A time T4 corresponds to a real time of 12:40 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:51. Thus, the expected time of the secure clock is 1:01 (e.g., 12:51+10 minutes=1:01). At time T4, the system clock reads 1:10. A present skew 525D is calculated as being a difference between the time of the system clock and the expected time of the secure clock (step 420, FIG. 4). In this example, the present skew is 9 minutes (e.g., 1:10−1:01=9 minutes).

A cumulative skew 530D is calculated by adding the present skew to a running total of the skew (step 425, FIG. 4). In this example, the cumulative skew is 30 minutes (e.g., 21 minutes+9 minutes=30 minutes). The cumulative skew is checked against the clock-violation alert and action thresholds (step 430, FIG. 4).

The cumulative skew of 30 minutes is above or has reached the clock-violation alert threshold of 20 minutes (step 445, FIG. 4), but is still below the clock-violation action threshold of 60 minutes. Thus, a clock-violation alert message is generated and transmitted (step 450, FIG. 4), filesystem operations are allowed to continue (step 440, FIG. 4); the secure clock is updated 535D to the system clock (step 442, FIG. 4); and the cumulative skew is updated 540D to the calculated cumulative skew (step 443, FIG. 4).

A time T5 corresponds to a real time of 12:50 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 1:10. Thus, the expected time of the secure clock is 1:20 (e.g., 1:10+10 minutes=1:20). At time T5, the system clock reads 1:58. A present skew 525E is calculated as being a difference between the time of the system clock and the expected time of the secure clock (step 420, FIG. 4). In this example, the present skew is 38 minutes (e.g., 1:58−1:20=38 minutes).

A cumulative skew 530E is calculated by adding the present skew to a running total of the skew (step 425, FIG. 4). In this example, the cumulative skew is 68 minutes (e.g., 30 minutes+38 minutes=68 minutes). The cumulative skew is checked against the clock-violation alert and action thresholds (step 430, FIG. 4).

The cumulative skew of 68 minutes has now reached or is above the clock-violation action threshold of 60 minutes (step 455, FIG. 4). Thus, a clock-violation action message is generated and transmitted (step 460, FIG. 4) and one or more clock-violation actions are triggered—e.g., trigger at least a partial disabling of the filesystem—(step 465). Operations to delete files may be blocked even if the retention dates of the files have expired according to the system clock. Since the cumulative skew has reached the threshold for triggering a clock-violation action, the secure clock is not updated 535E to the system clock, and the cumulative skew is not updated 540E to the calculated cumulative skew.

Figure 6:
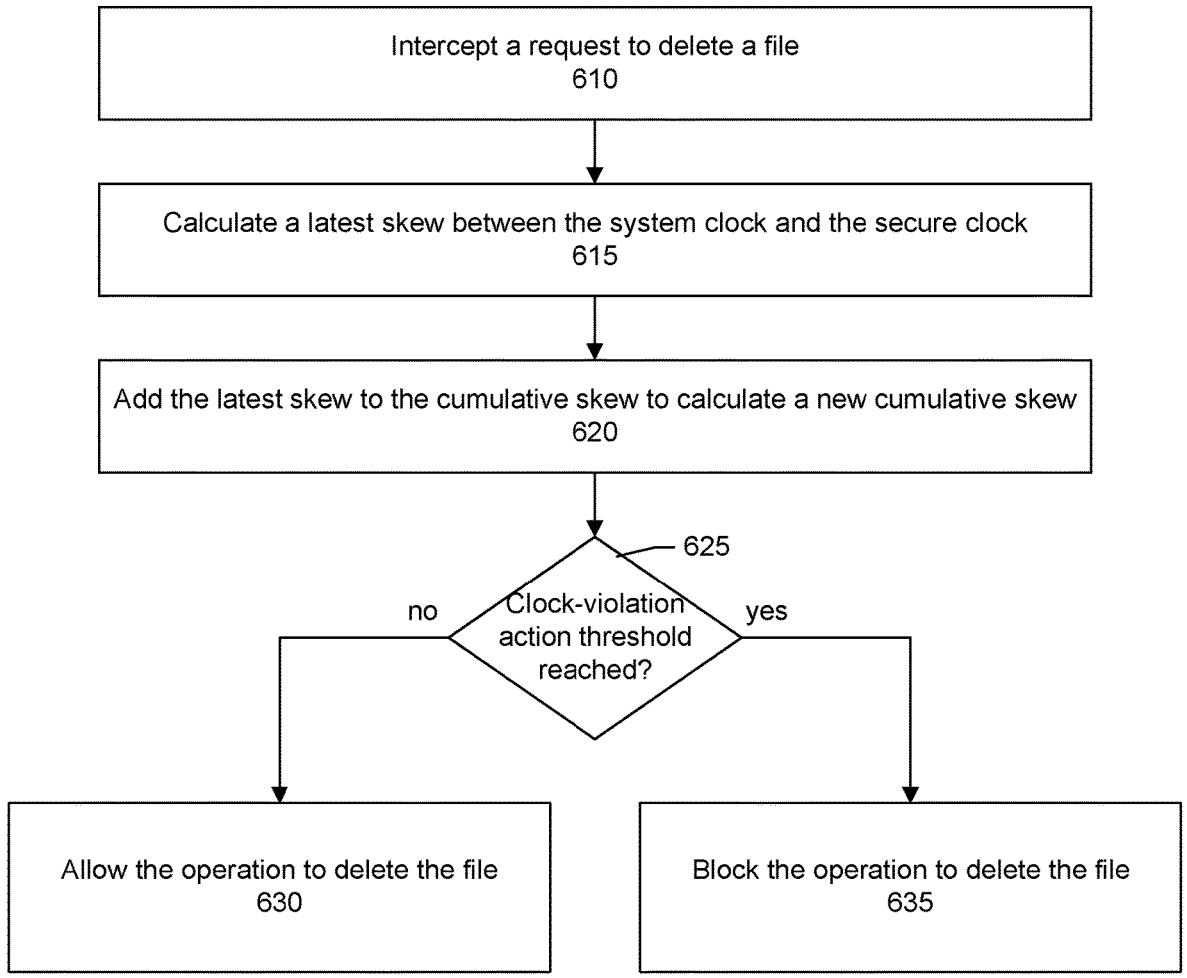
FIG. 6 shows a flow for checking whether a file should be permitted to be deleted in accordance with one or more embodiments.

FIG. 6 shows a flow for validating with the secure clock upon a request to delete a file. In a specific embodiment, requests to delete a file are intercepted. Before these requested operations are allowed to complete, a validation with the secure clock is performed to ensure that the clock-violation action threshold has not been reached.

More particularly, in a step 610, a request to delete a file is intercepted. For example, there can be module at the operating system or filesystem level to intercept such requests. The file may have retention lock that has (or has not) expired according to the system clock.

In a step 615, a latest skew is calculated between the system clock and the secure clock. In a step 620 the latest skew is added to the cumulative skew to calculate a new cumulative skew. In a step 625, a determination is made as to whether the clock-violation action threshold has been reached. If the clock-violation action threshold has not been reached (and if the retention lock on the file has expired), the requested operation to delete the file is allowed (step 630).

Alternatively, if the clock-violation action threshold has been reached, the requested operation to delete the file is blocked or not allowed (step 635).

Figure 7:
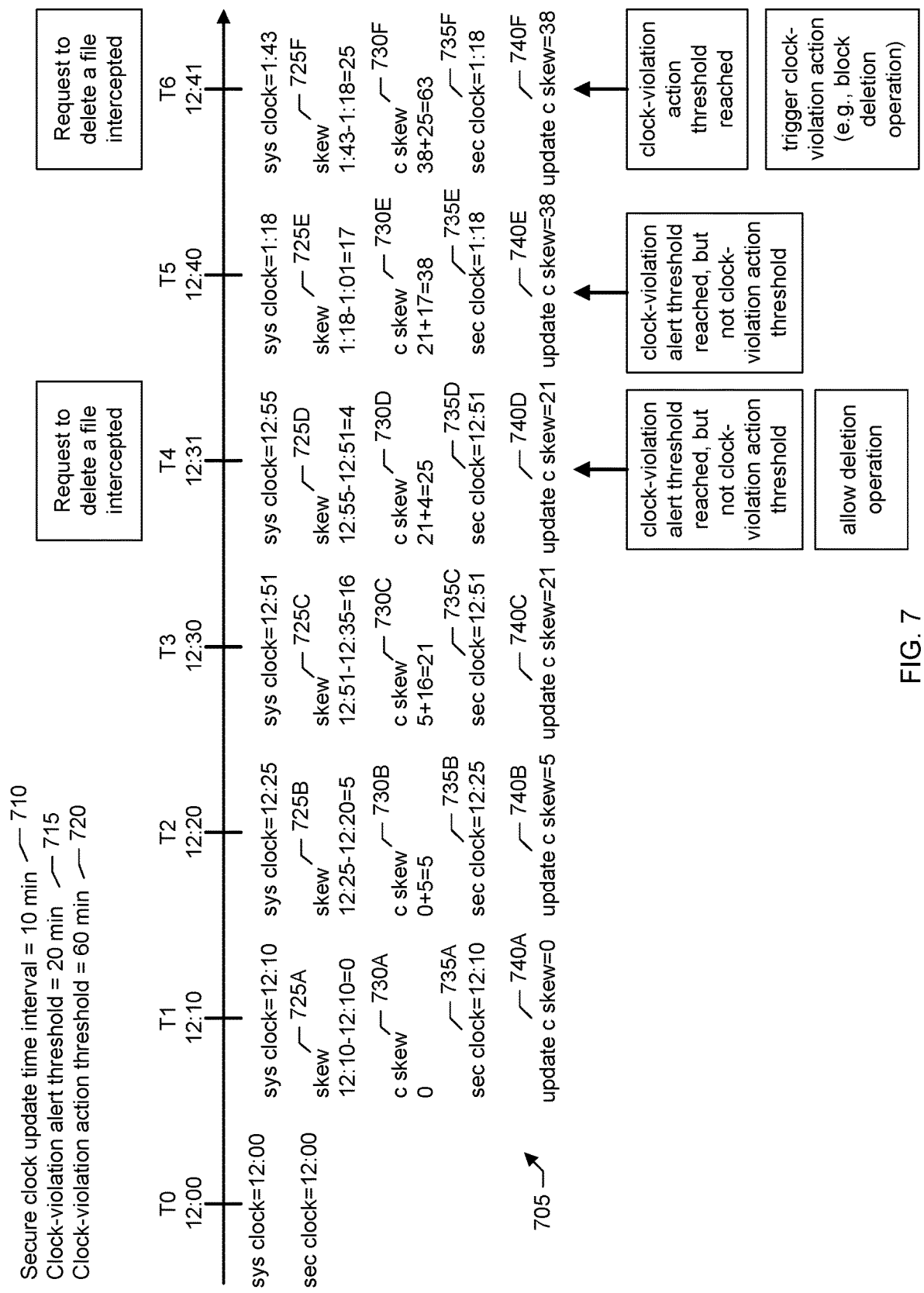
FIG. 7 shows another example of a timeline and some events that may occur during the monitoring in accordance with one or more embodiments.

FIG. 7 shows another example of a timeline 705 of events that may be handled and managed by the secure clock. The example shown in FIG. 7 is similar to the example shown in FIG. 5. For example, a sample configuration includes a secure clock update time interval 710 set to 10 minutes, a clock-violation alert threshold 715 set to 20 minutes, and a clock-violation action threshold 720 set to 60 minutes.

At a time T0, the system and secure clocks have been initialized to a same time, e.g., 12:00 (step 220, FIG. 2).

A time T1 corresponds to a real time of 12:10 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:00. Thus, the expected time of the secure clock is 12:10 (e.g., 12:00+10 minutes=12:10). At time T1, the system clock reads 12:10. A present, latest, or new skew 725A is calculated as being a difference between the time of the system clock and the expected time of the secure clock (step 420, FIG. 4). In this example, the present skew is 0 minutes (e.g., 12:10−12:10=0 minutes).

A cumulative skew 730A is calculated by adding the present skew to a running total of the skew (step 425, FIG. 4). In this example, the cumulative skew remains 0 minutes. The cumulative skew is checked against the clock-violation alert and action thresholds (step 430, FIG. 4).

Since the cumulative skew of 0 minutes is below the clock-violation alert threshold of 20 minutes and the clock-violation action threshold of 60 minutes (step 435, FIG. 4), filesystem operations are allowed to continue as normal (step 440, FIG. 4); the secure clock is updated 735A to the system clock (step 442, FIG. 4); and the cumulative skew is updated 740A to the calculated cumulative skew (step 443, FIG. 4).

A time T2 corresponds to a real time of 12:20 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:10. Thus, the expected time of the secure clock is 12:20 (e.g., 12:10+10 minutes=12:20). At time T2, the system clock reads 12:25. A present skew 725B is calculated as being a difference between the time of the system clock and the expected time of the secure clock (step 420, FIG. 4). In this example, the present skew is 5 minutes (e.g., 12:25−12:20=5 minutes).

A cumulative skew 730B is calculated by adding the present skew to a running total of the skew (step 425, FIG. 4). In this example, the cumulative skew is 5 minutes (e.g., 0 minutes+5 minutes=5 minutes). The cumulative skew is checked against the clock-violation alert and action thresholds (step 430, FIG. 4).

Since the cumulative skew of 5 minutes is below the clock-violation alert threshold of 20 minutes and the clock-violation action threshold of 60 minutes (step 435, FIG. 4), filesystem operations are allowed to continue as normal (step 440, FIG. 4); the secure clock is updated 735B to the system clock (step 442, FIG. 4); and the cumulative skew is updated 740B to the calculated cumulative skew (step 443, FIG. 4).

A time T3 corresponds to a real time of 12:30 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:25. Thus, the expected time of the secure clock is 12:35 (e.g., 12:25+10 minutes=12:35). At time T3, the system clock reads 12:51. A present skew 725C is calculated as being a difference between the time of the system clock and the expected time of the secure clock (step 420, FIG. 4). In this example, the present skew is 16 minutes (e.g., 12:51−12:35=16 minutes).

A cumulative skew 730C is calculated by adding the present skew to a running total of the skew (step 425, FIG. 4). In this example, the cumulative skew is 21 minutes (e.g., 5 minutes+16 minutes=21 minutes). The cumulative skew is checked against the clock-violation alert and action thresholds (step 430, FIG. 4).

The cumulative skew of 21 minutes is above or has reached the clock-violation alert threshold of 20 minutes (step 445, FIG. 4), but is still below the clock-violation action threshold of 60 minutes. Thus, a clock-violation alert message is generated and transmitted (step 450, FIG. 4), filesystem operations are allowed to continue (step 440, FIG. 4); the secure clock is updated 735C to the system clock (step 442, FIG. 4); and the cumulative skew is updated 740C to the calculated cumulative skew (step 443, FIG. 4).

At a time T4 a request to delete a file is intercepted (step 610, FIG. 6). As shown in the example of FIG. 7, time T4 corresponds to a real time of 12:31 which is before a next time interval at which the secure clock is to be updated (e.g., request to delete file is between secure clock update intervals). The file may have a retention lock that has expired according to the system clock. To determine whether the operation to delete the file should be permitted, a validation check is performed with the secure clock.

More particularly, a present skew 725D is calculated as being a difference between the time of the system clock and the time of the secure clock (step 615, FIG. 6). Since the secure clock is between update time intervals, the time of the secure clock corresponds to a last update of the secure clock. At time T4, the system clock reads 12:55. Thus, in this example, the present skew is 4 minutes (e.g., 12:55−12:51=4 minutes).

A cumulative skew 730D is calculated by adding the present skew to a running total of the skew (step 620, FIG. 6). In this example, the cumulative skew is 25 minutes (e.g., 21 minutes+4 minutes=25 minutes). The cumulative skew is checked against the clock-violation action threshold (step 625, FIG. 6).

The cumulative skew of 25 minutes is below the clock-violation action threshold of 60 minutes. Thus, the operation to delete the file is allowed (step 630, FIG. 6). Since T4 is between secure clock update intervals, the secure clock and cumulative skew are not updated 735D, 740D.

A time T5 corresponds to a real time of 12:40 and an arrival of a time at which the secure clock is to be updated because the time interval at which the secure clock is to be updated has elapsed (step 415, FIG. 4). In particular, according the sample data in this example, the secure clock is to be updated every 10 minutes. Thus, an expected or updated time of the secure clock can be determined or calculated by adding 10 minutes to a previous time of the secure clock. The previous time of the secure clock is 12:51. Thus, the expected time of the secure clock is 1:05 (e.g., 12:51+10 minutes=1:01). At time T5, the system clock reads 1:18. A present skew 725E is calculated as being a difference between the time of the system clock and the expected time of the secure clock (step 420, FIG. 4). In this example, the present skew is 17 minutes (e.g., 1:18−1:01=17 minutes).

A cumulative skew 730E is calculated by adding the present skew to a running total of the skew (step 425, FIG. 4). In this example, the cumulative skew is 38 minutes (e.g., 21 minutes+17 minutes=38 minutes). The cumulative skew is checked against the clock-violation alert and action thresholds (step 430, FIG. 4).

The cumulative skew of 38 minutes is above or has reached the clock-violation alert threshold of 20 minutes (step 445, FIG. 4), but is still below the clock-violation action threshold of 60 minutes. Thus, a clock-violation alert message is generated and transmitted (step 450, FIG. 4), filesystem operations are allowed to continue (step 440, FIG. 4); the secure clock is updated 735E to the system clock (step 442, FIG. 4); and the cumulative skew is updated 740E to the calculated cumulative skew (step 443, FIG. 4).

At a time T6 a request to delete a file is intercepted (step 610, FIG. 6). As shown in the example of FIG. 7, time T6 corresponds to a real time of 12:41 which is before a next time interval at which the secure clock is to be updated (e.g., request to delete file is between secure clock update intervals). The file may have a retention lock that has expired according to the system clock. As discussed, to determine whether the operation to delete the file should be permitted, a validation check is performed with the secure clock.

More particularly, a present skew 725F is calculated as being a difference between the time of the system clock and the time of the secure clock (step 615, FIG. 6). Since the secure clock is between update time intervals, the time of the secure clock corresponds to a last update of the secure clock. At time T6, the system clock reads 1:43. Thus, in this example, the present skew is 25 minutes (e.g., 1:43−1:18=25 minutes).

A cumulative skew 730F is calculated by adding the present skew to a running total of the skew (step 620, FIG. 6). In this example, the cumulative skew is 63 minutes (e.g., 38 minutes+25 minutes=63 minutes). The cumulative skew is checked against the clock-violation action threshold (step 625, FIG. 6).

The cumulative skew of 63 minutes is above the clock-violation action threshold of 60 minutes. Thus, a clock-violation action is triggered that includes blocking the operation to delete the file (step 635, FIG. 6). The secure clock is not updated 735F to the system clock. Similarly, since T6 is in the middle of or between update intervals, the cumulative skew, in addition to the secure clock, will not be updated 740F. Instead, the update will occur at a next interval.

As discussed, the file may have a retention lock that has expired according to the system clock. However, as indicated by the cumulative skew between the system clock and the secure clock, there may have been some tampering with the system clock. A rogue actor may have advanced the system clock in an attempt to cause a premature expiration of the retention lock on the file. Thus, blocking the delete operation helps to preserve the file while providing an opportunity for an administrator to investigate the issue.

In a specific embodiment, there is a method of ensuring retention lock compliance for files in a filesystem comprising: initializing a system clock and a secure clock to a same time; configuring a first threshold and a second threshold, greater than the first threshold, the first threshold corresponding to a clock-violation alert and the second threshold corresponding to one or more clock-violation actions; configuring a time interval at which the secure clock is updated; upon arrival of each time interval, (1) calculating an expected time of the secure clock by adding a duration of the time interval to a last time of the secure clock; (2) calculating a skew between a time of the system clock and the expected time of the secure clock; (3) updating a cumulative skew by adding the skew to a running total of previous skews; (4) checking the cumulative skew against one or more of the first and second thresholds; (5) if the cumulative skew is below the first threshold, allowing normal operation of the filesystem to continue, and setting a time of the secure clock to the time of the system clock; (6) if the cumulative skew is above the first threshold and below the second threshold, generating the clock-violation alert, allowing the normal operation of the filesystem to continue, and setting the time of the secure clock to the time of the system clock; and (7) if the cumulative skew is above the second threshold, disabling, at least partially, the filesystem, and not setting the time of the secure clock to the time of the system clock; intercepting an operation to delete a file having a retention lock that has expired according to the system clock; and before allowing the operation to continue, (1) calculating a current skew between the time of the system clock and the time of the secure clock; (2) calculating the cumulative skew by adding the current skew to the running total of previous skews; (3) checking the cumulative skew against one or more of the first and second thresholds; (4) if the cumulative skew is below the first threshold, allowing the operation to delete the file proceed; (5) if the cumulative skew is above the first threshold and below the second threshold, allowing the operation to delete the file to proceed; and (6) if the cumulative skew is above the second threshold, not allowing the operation to delete the file to proceed. Here the secure clock time will not be updated for any of the above cases and it will be done when the next interval for the secure clock update comes up.

Below are some use-cases for a retention-lock compliance enabled system.

1) Attempt to Change System Time

On a retention-lock compliance enabled system, if the rogue administrator tries to move the system time ahead by more than date-change-limit (or) more often than the date-change-frequency value, system would error out and raise an alert.

2) Attempt to Sync to a Compromised NTP Timeserver

On a retention-lock compliance enabled system, if the rogue administrator tries to add/enable/sync NTP timeserver(s) that has a time difference beyond the date-change-limit with system time, system would error out and raise an alert.

3) Attempt to Circumvent Maximum Allowed Time Change

On a retention-lock compliance enabled system, even if the rogue administrator moves the system ahead honoring date-change-limit and date-change-frequency, the secure clock would accumulate all the skew and raise alerts as the skew increases beyond certain levels. It would also take an appropriate clock-violation-action, when the skew reaches a configured threshold. In addition, system continues to raise alert whenever rogue administrator modifies system time.

In an embodiment, systems and techniques are provided to protect against a compromised NTP server. For example, merely requiring that NTP be enabled is insufficient. The NTP server may be controlled by a third party external to the customer. So, there can be an increased risk of tampering with the NTP server. It is desirable that there be an enforcement of security measures when the administrator tries to synchronize with a hacked NTP server. A hacked NTP server can lead to premature aging of records as the system clock can be accelerated by syncing to a hacked NTP timeserver.

Consider, as an example, that the NTP service on the system synchronizes with the NTP timeserver if the time-difference is more than 128 milliseconds for more than 900 seconds. As an example, if NTP was hacked and NTP time is moved ahead by more than 60 days, administrator can synchronize the system time to NTP time. If the retention-lock is configured to be 60 days, then the lock will expire and files can be modified.

In an embodiment, the secure clock will not be allowed to synchronize to NTP time because the administrator can only move the clock in a controlled manner that is restricted by the date-change-limit and date-change-frequency values.

Consider, as another example, that given the NTP protocol behavior, system time synchronizes with the NTP timeserver when the rogue NTP administrator continues to move the clock ahead by 999 seconds every 900 seconds. If the rogue NTP administrator repeats this operation, it would affect the system time. For example, a retention lock for 60 days can be made to expire in 54 days using this approach.

In an embodiment, systems and techniques are provided that help to ensure retention-lock compliance in such a scenario. Specifically, the alert mechanism can let the administrator take corrective actions even before a clock-violation-action gets triggered. If alerts are ignored, the secure clock detects the skew and automatically takes one or more corrective actions (i.e., clock-violation-actions) that had been previously configured by the administrator during an initial setup of the system.

In an embodiment, systems and techniques are provided to account for the time when the system is down. Consider, as an example, a case where the time is not accounted for. This would mean, when the system starts again, the secure clock would maintain an old time and would lead to retention of files for longer duration than intended. The administrator may not have control over how much the system time can be moved ahead. Because of this, the system time may not be reliable and the secure clock may not synchronize to system time.

In an embodiment, if the system reboots, the secure clock is synchronized to system time and the skew value will not increase. This is made possible because system time is tightly controlled by date-change-limit and date-change-frequency parameters, thus restricting the administrator from tampering with the system time. Also, this ensures that files are not retained for a longer duration than intended and no premature clock-violation-action gets triggered.

As discussed, it is desirable to provide protection against hacked NTP servers. It cannot be assumed that the NTP servers are always trusted and secure. With a hacked NTP server, the compliance clock will also be automatically synchronized to the skewed system time (due to a bad NTP server) and eventually lead to the retention periods being compromised and compliance mandates being violated.

In an embodiment, the secure clock is not to be allowed to synchronize to NTP time because the administrator can only move the clock in controlled manner restricted by date-change-limit and date-change-frequency values. Also, the alert mechanism can let the administrator take corrective actions even before a clock-violation-action gets triggered. If alerts are ignored, the secure clock would detect the skew and automatically take one or more corrective actions (i.e., clock-violation-action) that had been previously configured by the administrator.

In a specific embodiment, there is a method of ensuring retention lock compliance for files in a filesystem comprising: initializing a system clock and a secure clock to a same time; setting a first threshold and a second threshold, greater than the first threshold, the first threshold corresponding to a clock-violation alert and the second threshold corresponding to one or more clock-violation actions; scheduling a time interval at which the secure clock is to be updated; upon arrival of each time interval, updating the secure clock based on the time interval and calculating a skew between the system clock and the secure clock; maintaining a cumulative skew between the system clock and the secure clock; determining that the cumulative skew has reached the first threshold but not the second threshold; upon the determination that the cumulative skew has reached the first threshold but not the second threshold, triggering the clock-violation alert while continuing to allow deletions of files having retention locks that have expired according to the system clock; determining that the cumulative skew has reached the second threshold; and upon the determination that the cumulative skew has reached the second threshold, triggering a first clock-violation action comprising blocking the deletions of files having retention locks that have expired according to the system clock.

The method may include intercepting an operation to delete a file having a retention lock that has expired according to the system clock, the interception being before a next time interval at which the secure clock is scheduled to be updated; calculating a latest skew between the system clock and the secure clock; adding the latest skew to the cumulative skew to calculate a new cumulative skew; if the new cumulative skew has not reached the second threshold, allowing the operation to delete the file having the retention lock that has expired according to the system clock; and if the new cumulative skew has reached the second threshold, blocking the operation to delete the file having the retention lock that has expired according to the system clock.

The method may include upon the determination that the cumulative skew has reached the second threshold, trigging one or more other clock-violation actions, the one or more other clock-violation actions comprising at least one of disabling the filesystem, making the filesystem read-only, updating effective expiration dates of files in the filesystem by adding the cumulative skew to recorded expiration dates of the files, or disabling deletion operations for all files in the filesystem.

The method may include storing data of the secure clock in a binary format that is proprietary to the filesystem. The method may include restricting access to data of the secure clock to a cryptographically protected system shell.

The method may include during an initial configuration of the filesystem, prompting an administrator user to provide one or more of a plurality of configuration values, the plurality of configuration values comprising: the first threshold corresponding to the clock-violation alert, the second threshold corresponding to the one or more clock-violation actions, a selection of the one or more clock-violation actions to be triggered when the second threshold is reached, a maximum amount of time that the system clock can be changed, and a maximum change frequency for the system clock.

In a specific embodiment, there is a system for ensuring retention lock compliance for files in a filesystem, the system comprising: a processor; and memory configured to store one or more sequences of instructions which, when executed by the processor, cause the processor to carry out the steps of: initializing a system clock and a secure clock to a same time; setting a first threshold and a second threshold, greater than the first threshold, the first threshold corresponding to a clock-violation alert and the second threshold corresponding to one or more clock-violation actions; scheduling a time interval at which the secure clock is to be updated; upon arrival of each time interval, updating the secure clock based on the time interval and calculating a skew between the system clock and the secure clock; maintaining a cumulative skew between the system clock and the secure clock; determining that the cumulative skew has reached the first threshold but not the second threshold; upon the determination that the cumulative skew has reached the first threshold but not the second threshold, triggering the clock-violation alert while continuing to allow deletions of files having retention locks that have expired according to the system clock; determining that the cumulative skew has reached the second threshold; and upon the determination that the cumulative skew has reached the second threshold, triggering a first clock-violation action comprising blocking the deletions of files having retention locks that have expired according to the system clock.

In another specific embodiment, there is a computer program product, comprising a non-transitory computer-readable medium having a computer-readable program code embodied therein, the computer-readable program code adapted to be executed by one or more processors to implement a method for ensuring retention lock compliance for files in a filesystem, the method comprising: initializing a system clock and a secure clock to a same time; setting a first threshold and a second threshold, greater than the first threshold, the first threshold corresponding to a clock-violation alert and the second threshold corresponding to one or more clock-violation actions; scheduling a time interval at which the secure clock is to be updated; upon arrival of each time interval, updating the secure clock based on the time interval and calculating a skew between the system clock and the secure clock; maintaining a cumulative skew between the system clock and the secure clock; determining that the cumulative skew has reached the first threshold but not the second threshold; upon the determination that the cumulative skew has reached the first threshold but not the second threshold, triggering the clock-violation alert while continuing to allow deletions of files having retention locks that have expired according to the system clock; determining that the cumulative skew has reached the second threshold; and upon the determination that the cumulative skew has reached the second threshold, triggering a first clock-violation action comprising blocking the deletions of files having retention locks that have expired according to the system clock.

In a specific embodiment, an administrative user can configure first and second threshold values. The second threshold can be greater than the first threshold. In this specific embodiment, when the cumulative skew reaches the first threshold (but not the second threshold), a clock-violation alert is triggered which results in an alert notification being generated and transmitted to the administrators. The filesystem, however, is allowed to continue to operate and service requests as normal. This provides an opportunity for an administrator to investigate while preventing disruption to normal business operations. If, however, the cumulative skew reaches the second threshold, a clock-violation action is triggered.

Figure 8:
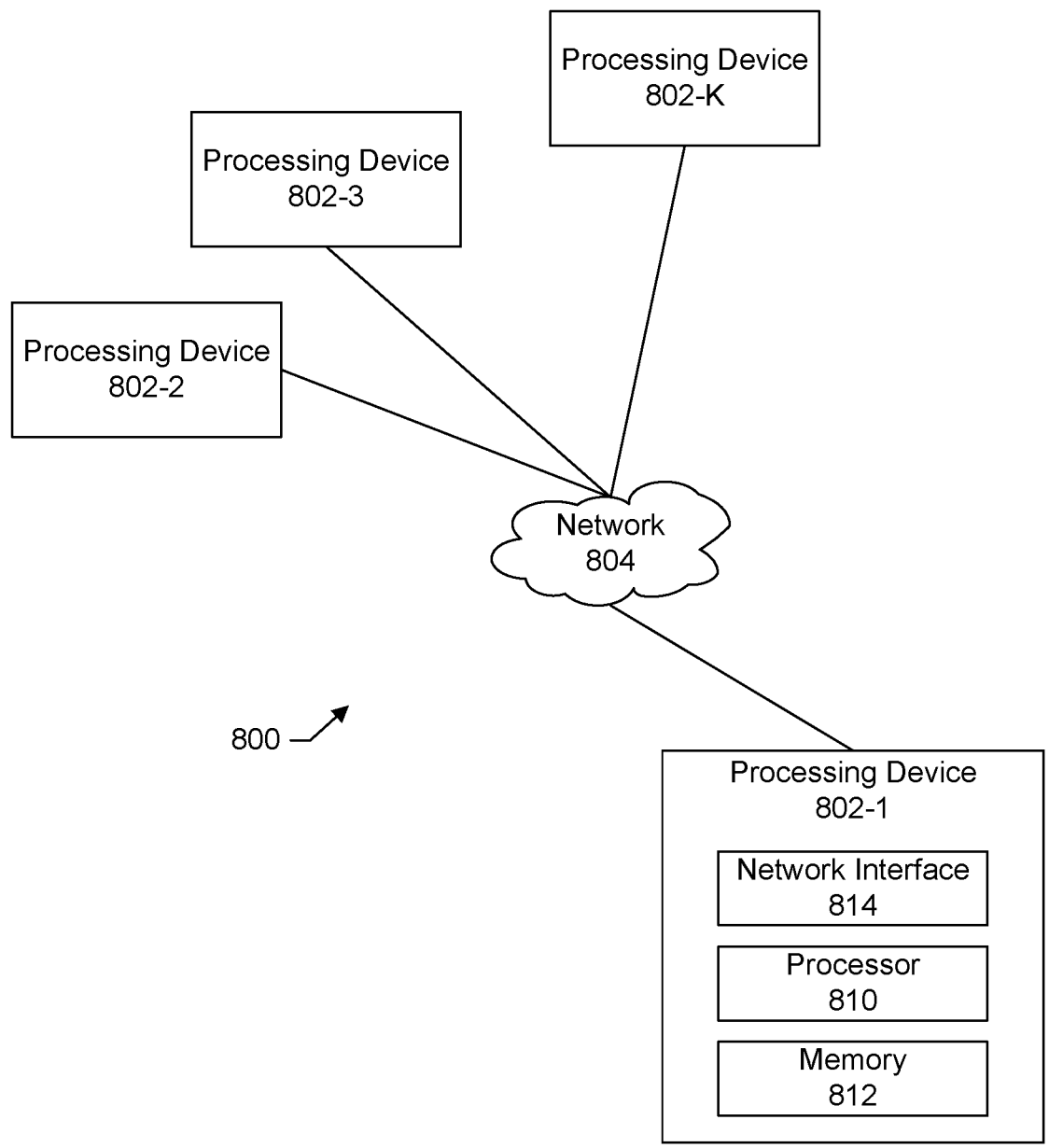
FIG. 8 shows a block diagram of a processing platform that may be utilized to implement at least a portion of an information processing system, according to one or more embodiments.

FIG. 8 shows an example of a processing platform 800. The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 110 are illustratively implemented in the form of software running on one or more processing devices.

Figure 9:
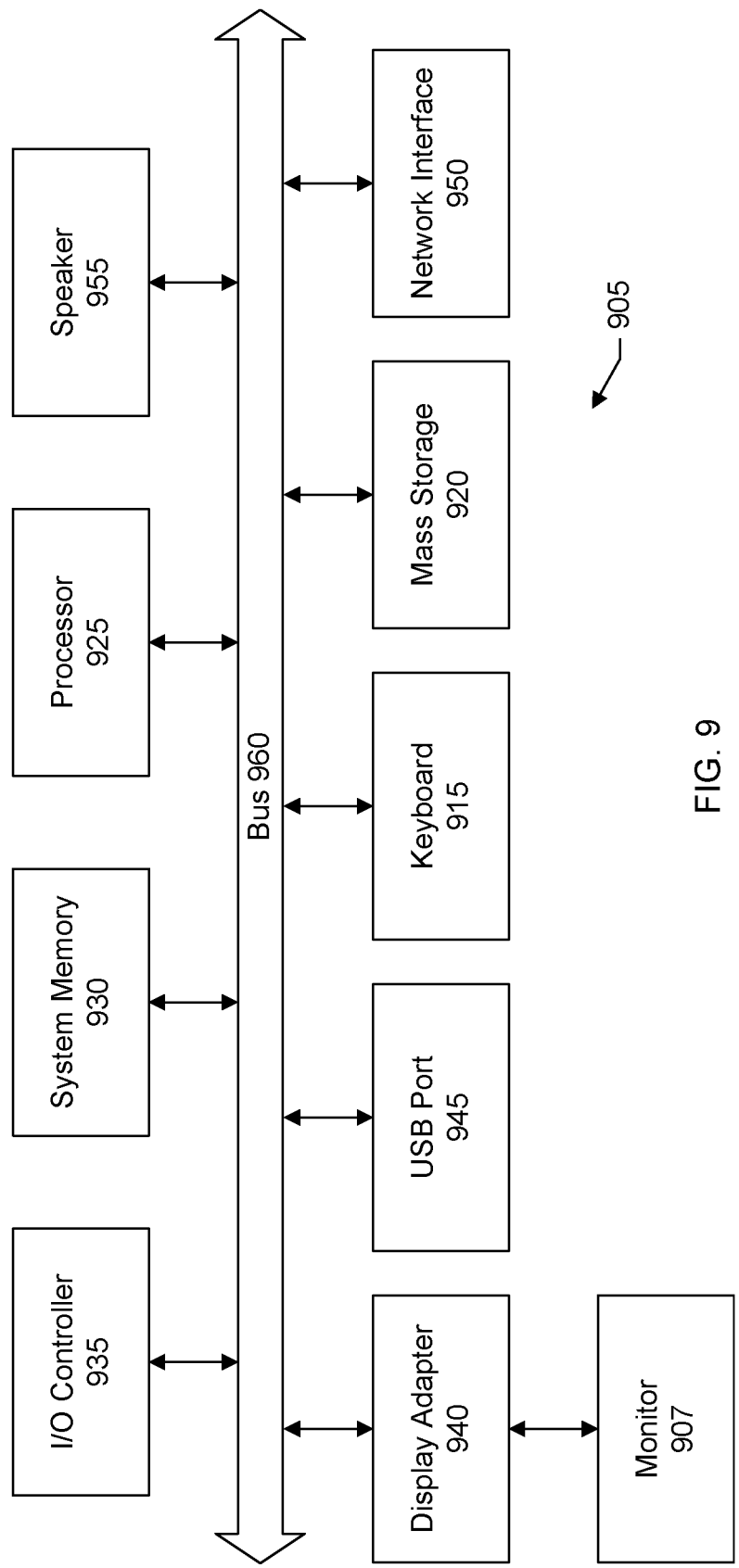
FIG. 9 shows a block diagram of a computer system suitable for use with the information processing system, according to one or more embodiments.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®, family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of ensuring retention lock compliance for files in a filesystem comprising:
    initializing a system clock and a secure clock to a same time;
    setting a first threshold at which a clock-violation alert is triggered;
    setting a second threshold, greater than the first threshold, at which one or more clock-violation actions are triggered;
    scheduling a time interval at which the secure clock is to be updated;
    upon arrival of each time interval, updating the secure clock based on the time interval and calculating a skew between the system clock and the secure clock;
    maintaining a cumulative skew between the system clock and the secure clock;
    determining that the cumulative skew has reached the first threshold but not the second threshold;
    upon the determination that the cumulative skew has reached the first threshold but not the second threshold, triggering the clock-violation alert; and
        continuing to allow deletions of files having retention locks that have expired according to the system clock because the cumulative skew has not reached the second threshold;
    determining that the cumulative skew has now reached the second threshold; and
    upon the determination that the cumulative skew has now reached the second threshold, triggering a first clock-violation action comprising blocking the deletions of files having retention locks that have expired according to the system clock.

2. The method of claim 1 further comprising:
    intercepting an operation to delete a file having a retention lock that has expired according to the system clock, the interception being before a next time interval at which the secure clock is scheduled to be updated;

calculating a latest skew between the system clock and the secure clock;

adding the latest skew to the cumulative skew to calculate a new cumulative skew;

if the new cumulative skew has not reached the second threshold, allowing the operation to delete the file having the retention lock that has expired according to the system clock; and if the new cumulative skew has reached the second threshold, blocking the operation to delete the file having the retention lock that has expired according to the system clock.

3. The method of claim 1 further comprising:

upon the determination that the cumulative skew has reached the second threshold, trigging one or more other clock-violation actions, the one or more other clock-violation actions comprising at least one of disabling the filesystem, making the filesystem read-only, updating effective expiration dates of files in the filesystem by adding the cumulative skew to recorded expiration dates of the files, or disabling deletion operations for all files in the filesystem.

4. The method of claim 1 further comprising:

storing data of the secure clock in a binary format that is proprietary to the filesystem.

5. The method of claim 1 further comprising:

restricting access to data of the secure clock to a cryptographically protected system shell.

6. The method of claim 1 further comprising:

during an initial configuration of the filesystem, prompting an administrator user to provide one or more of a plurality of configuration values, the plurality of configuration values comprising:

the first threshold corresponding to the clock-violation alert, the second threshold corresponding to the one or more clock-violation actions, a selection of the one or more clock-violation actions to be triggered when the second threshold is reached, a maximum amount of time that the system clock can be changed, and a maximum change frequency for the system clock.

7. A system for ensuring retention lock compliance for files in a filesystem, the system comprising: a processor; and memory configured to store one or more sequences of instructions which, when executed by the processor, cause the processor to carry out the steps of:

initializing a system clock and a secure clock to a same time;

setting a first threshold at which a clock-violation alert is triggered;

setting a second threshold, greater than the first threshold, at which one or more clock-violation actions are triggered;

scheduling a time interval at which the secure clock is to be updated;

upon arrival of each time interval, updating the secure clock based on the time interval and calculating a skew between the system clock and the secure clock;

maintaining a cumulative skew between the system clock and the secure clock;

determining that the cumulative skew has reached the first threshold but not the second threshold;

upon the determination that the cumulative skew has reached the first threshold but not the second threshold, triggering the clock-violation alert; and continuing to allow deletions of files having retention locks that have expired according to the system clock because the cumulative skew has not reached the second threshold;

determining that the cumulative skew has now reached the second threshold; and upon the determination that the cumulative skew has now reached the second threshold, triggering a first clock-violation action comprising blocking the deletions of files having retention locks that have expired according to the system clock.

8. The system of claim 7 wherein the processor further carries out the steps of:

intercepting an operation to delete a file having a retention lock that has expired according to the system clock, the interception being before a next time interval at which the secure clock is scheduled to be updated;

calculating a latest skew between the system clock and the secure clock;

adding the latest skew to the cumulative skew to calculate a new cumulative skew;

if the new cumulative skew has not reached the second threshold, allowing the operation to delete the file having the retention lock that has expired according to the system clock; and if the new cumulative skew has reached the second threshold, blocking the operation to delete the file having the retention lock that has expired according to the system clock.

9. The system of claim 7 wherein the processor further carries out the steps of:

upon the determination that the cumulative skew has reached the second threshold, trigging one or more other clock-violation actions, the one or more other clock-violation actions comprising at least one of disabling the filesystem, making the filesystem read-only, updating effective expiration dates of files in the filesystem by adding the cumulative skew to recorded expiration dates of the files, or disabling deletion operations for all files in the filesystem.

10. The system of claim 7 wherein the processor further carries out the steps of:

storing data of the secure clock in a binary format that is proprietary to the filesystem.

11. The system of claim 7 wherein the processor further carries out the steps of:

restricting access to data of the secure clock to a cryptographically protected system shell.

12. The system of claim 7 wherein the processor further carries out the steps of:

during an initial configuration of the filesystem, prompting an administrator user to provide one or more of a plurality of configuration values, the plurality of configuration values comprising:

the first threshold corresponding to the clock-violation alert, the second threshold corresponding to the one or more clock-violation actions, a selection of the one or more clock-violation actions to be triggered when the second threshold is reached, a maximum amount of time that the system clock can be changed, and a maximum change frequency for the system clock.

13. A computer program product, comprising a non-transitory computer-readable medium having a computer-readable program code embodied therein, the computer-readable program code adapted to be executed by one or more processors to implement a method for ensuring retention lock compliance for files in a filesystem, the method comprising:

initializing a system clock and a secure clock to a same time;
   setting a first threshold at which a clock-violation alert is triggered;
   setting a second threshold, greater than the first threshold, at which one or more clock-violation actions are triggered;
   scheduling a time interval at which the secure clock is to be updated;
   upon arrival of each time interval, updating the secure clock based on the time interval and calculating a skew between the system clock and the secure clock;
   maintaining a cumulative skew between the system clock and the secure clock;
   determining that the cumulative skew has reached the first threshold but not the second threshold;
   upon the determination that the cumulative skew has reached the first threshold but not the second threshold, triggering the clock-violation alert; and
       continuing to allow deletions of files having retention locks that have expired according to the system clock because the cumulative skew has not reached the second threshold;
   determining that the cumulative skew has now reached the second threshold; and
   upon the determination that the cumulative skew has now reached the second threshold, triggering a first clock-violation action comprising blocking the deletions of files having retention locks that have expired according to the system clock.

14. The computer program product of claim 13 wherein the method further comprises:

intercepting an operation to delete a file having a retention lock that has expired according to the system clock, the interception being before a next time interval at which the secure clock is scheduled to be updated;
   calculating a latest skew between the system clock and the secure clock;
   adding the latest skew to the cumulative skew to calculate a new cumulative skew;
   if the new cumulative skew has not reached the second threshold, allowing the operation to delete the file having the retention lock that has expired according to the system clock; and
   if the new cumulative skew has reached the second threshold, blocking the operation to delete the file having the retention lock that has expired according to the system clock.

15. The computer program product of claim 13 wherein the method further comprises:

upon the determination that the cumulative skew has reached the second threshold, trigging one or more other clock-violation actions, the one or more other clock-violation actions comprising at least one of disabling the filesystem, making the filesystem read-only, updating effective expiration dates of files in the filesystem by adding the cumulative skew to recorded expiration dates of the files, or disabling deletion operations for all files in the filesystem.

16. The computer program product of claim 13 wherein the method further comprises:

storing data of the secure clock in a binary format that is proprietary to the filesystem.

17. The computer program product of claim 13 wherein the method further comprises:

restricting access to data of the secure clock to a cryptographically protected system shell.

18. The computer program product of claim 13 wherein the method further comprises:

during an initial configuration of the filesystem, prompting an administrator user to provide one or more of a plurality of configuration values, the plurality of configuration values comprising:
       the first threshold corresponding to the clock-violation alert,
       the second threshold corresponding to the one or more clock-violation actions,
       a selection of the one or more clock-violation actions to be triggered when the second threshold is reached,
       a maximum amount of time that the system clock can be changed, and
       a maximum change frequency for the system clock.

* * * * *